(12) United States Patent
Wales

(10) Patent No.: US 7,292,563 B1
(45) Date of Patent: Nov. 6, 2007

(54) METHOD OF ASSOCIATING A TRAINING CODE TO A CHANNELISATION CODE IN A MOBILE TELECOMMUNICATION SYSTEM

(75) Inventor: Stephen William Wales, Hampshire (GB)

(73) Assignee: Roke Manor Research Limited, Romsey (GB)

(*) Notice: Subject to any disclaimer, the term of this patent is extended or adjusted under 35 U.S.C. 154(b) by 542 days.

(21) Appl. No.: 10/009,948

(22) PCT Filed: Jun. 19, 2000

(86) PCT No.: PCT/GB00/02394

§ 371 (c)(1),
(2), (4) Date: May 9, 2002

(87) PCT Pub. No.: WO01/01618

PCT Pub. Date: Jan. 4, 2001

(30) Foreign Application Priority Data

Jun. 25, 1999 (GB) ................................. 9914858.7

(51) Int. Cl.
*H04B 7/216* (2006.01)

(52) U.S. Cl. ........................ 370/342; 370/208; 370/335
(58) Field of Classification Search ................ 370/208, 370/209, 335, 342
See application file for complete search history.

(56) References Cited

U.S. PATENT DOCUMENTS

| | | | | |
|---|---|---|---|---|
| 5,345,472 A | * | 9/1994 | Lee ............................ | 370/342 |
| 5,574,973 A | * | 11/1996 | Borth et al. ............. | 455/435.2 |
| 5,991,308 A | * | 11/1999 | Fuhrmann et al. ..... | 370/395.53 |
| 6,041,124 A | * | 3/2000 | Sugita ......................... | 380/270 |
| 6,108,369 A | * | 8/2000 | Ovesjo et al. .............. | 375/146 |
| 6,163,524 A | * | 12/2000 | Magnusson et al. ....... | 370/208 |
| 6,560,194 B1 | * | 5/2003 | Gourgue et al. ............ | 370/203 |
| 6,574,473 B2 | * | 6/2003 | Rinne et al. ................ | 455/436 |
| 6,693,952 B1 | * | 2/2004 | Chuah et al. ............... | 375/140 |

* cited by examiner

*Primary Examiner*—Chi Pham
*Assistant Examiner*—Kevin Mew
(74) *Attorney, Agent, or Firm*—Crowell & Moring LLP

(57) ABSTRACT

A method of associating the Training code to a Channelisation code in a mobile telecommunications system. The method includes associating a Training code with a Channelisation code prior to transmission according to a set of rules such that upon detection of the Training code by a receiver, the Channelisation code is known.

8 Claims, 3 Drawing Sheets

METHOD OF ASSOCIATING A TRAINING CODE TO A CHANNELISATION CODE IN A MOBILE TELECOMMUNICATION SYSTEM

The present invention relates to improvements in or relating to mobile telecommunication systems, and is more particularly concerned with such systems operating on code-time division multiple access.

BACKGROUND OF THE INVENTION

The UMTS terrestrial radio access (UTRA)—time division duplex (TDD) system is based on a combination of code division multiple access (CDMA) and hybrid time division multiple access (TDMA) which is known in the art as code-time division multiple access (CTDMA). (UMTS is an acronym for universal mobile telecommunication system also known by persons skilled in the art.)

In time division multiple access (TDMA), the time axis is divided into a plurality of time slots and users are permitted to transmit in certain ones of those time slots. Code division multiple access (CDMA), on the other hand, utilises direct sequence spread spectrum (DSSS) where a data is multiplied by a spreading factor (Q) prior to transmission in order to encode the data.

Current mobile telecommunications systems comprise a plurality of telecommunication cells each having at least one base station and at least one mobile terminal. Both the base station and the mobile terminal are capable of functioning as a transmitter and a receiver of radio frequency (RF) signals.

In a CTDMA system a number of users are permitted to transmit data sets during the same time slot. Each data set in a given time slot is separated by code division.

In order to receive transmissions in each time slot, the receiver must be able to estimate the characteristics of the transmission channel between the transmitter and receiver. In mobile telecommunications applications multipath distortion can arise and training sequences or some known data content is needed to facilitate channel estimation in the receiver. The information needed to estimate the transmission channel's characteristics is contained in the channel's impulse response, a term well known in the art. The training sequence may be referred to as a Training code, Midamble code, or Pilot code, all terms well known in the art. For the purposes of the following discussion of the prior art and disclosure of the present invention, the term Training code will be used when referring to the training sequence as defined above.

The Training code is required on both the uplink from mobile terminal to base station and the downlink from the base station to the mobile terminal in order that each transmission path to and from each user can be estimated.

A separate and distinct code from the Training code is the Channelisation code. The Channelisation codes are orthogonal codes taken from the set of Walsh codes and is a term well known in the art. The Channelisation code contains an index number and a spreading factor, both of which serve to encode the data prior to transmission. Thus the Channelisation code is also required during both uplink and downlink in order to interpret a user's data.

To enable multiple spreading factors to be applied to different user's data within the same time slot the Channelisation codes are assigned in a particular way. The preferred method of assigning Channelisation codes, which is well known in the art, is the Orthogonal Variable Spreading Factor (OVSF) code relationship and is shown in the tree-link structure in FIG. 1.

Currently during the downlink, a single Training code is transmitted along with all the data sets of the users in a given time slot. The receiver detects all these data sets along with the single Training code. This is known in the art as Joint Detection and it increases the probability of detecting the data set of interest to a particular mobile terminal user. Having received all the data sets the Receiver must know all the active Channelisation codes in order to insure it is able to interpret the data set of interest.

A problem with the current method is that if the receiver is configured to detect 8 Channelisation codes but only 2 data sets are active, the performance of system will be decreased. Similarly if the receiver is configured to detect 2 Channelisation codes but 6 data sets are active, the performance of the system will be decreased.

Currently, on the uplink of a dedicated channel the base station will know both the Channelisation code and the Training code as it assigns them. The base station communicates these to the mobile terminal in the prior downlink transmission.

However, on the uplink of channels that are not dedicated, for example when the mobile terminal is first switched on, there is often no signalling mechanism to assign Channelisation codes and the mobile terminal will pick at random a Channelisation code to transmit with. Under these circumstances a fixed relationship between the training and Channelisation code must be adopted.

SUMMARY OF THE INVENTION

It is therefore an object of the present invention to provide a method of associating a Training code to a Channelisation code in a mobile telecommunications system such that upon detection of the Training code the Channelisation code is known.

According to the present invention there is provided a method of associating a Training code to a Channelisation code for use in a mobile telecommunication system comprising a base station and a mobile terminal, the method comprising the steps of selecting a Channelisation code, encoding data according to the Channelisation code, selecting a Training code based on a predetermined selection process, transmitting the Training code with the data, detecting the Training code and the data, and applying a set of rules to the Training code such that the Channelisation code is known, thereby facilitating interpretation of the data.

According to an aspect of the present invention, wherein the mobile telecommunications system is operating in an uplink mode, the steps include the mobile terminal selecting at random a Channelisation code from a plurality of available Channelisation codes, the predetermined selection process being such that the Training code selected for transmission to the base station is determined by the Channelisation code selected, and the set of rules applied to the Training code upon detection by the base station being such that for each Training code detected the Channelisation code used to encode the data received with that Training code is known.

According to a further aspect of the present invention, wherein the mobile telecommunications system is operating in a downlink mode, the steps include the base station assigning Training codes to users in a given time slot in a predetermined assignment sequence, the predetermined assignment sequence having a spreading factor associated therewith, and the base station and the mobile terminal having knowledge of the predetermined assignment sequence and associated spreading factor such that upon detection of the Training code by the mobile terminal the Channelisation code used to encode the data is known.

The method according to the present invention may be used in a Code-Division Multiple Access mobile telecommunication system.

Alternatively, the method may be used in a Code-Time Division Multiple Access mobile telecommunications system.

Alternatively, the method may be used in a time division duplex mobile telecommunication system.

Alternatively, the method may be used in a UMTS mobile telecommunications system.

Advantageously, the present invention eliminates the need for explicit transmission of the Training code during uplink mode of operation of a mobile telecommunications system with dedicated channels.

Furthermore, in systems with non-dedicated channels where the mobile terminal selects the Channelisation code at random, the association of the Training code and the Channelisation code is fixed, thus making the detection of data possible.

Advantageously, the present invention improves the performance of a mobile telecommunications system by insuring that the receiver knows the number of Channelisation codes active in a given time slot.

While the principle advantages and features of the invention have been described above, a greater understanding and appreciation of the invention may be obtained by referring to the drawings and detailed description of the preferred embodiment, presented by way of example only, in which;

DETAILED DESCRIPTION OF THE INVENTION

Figure 1:
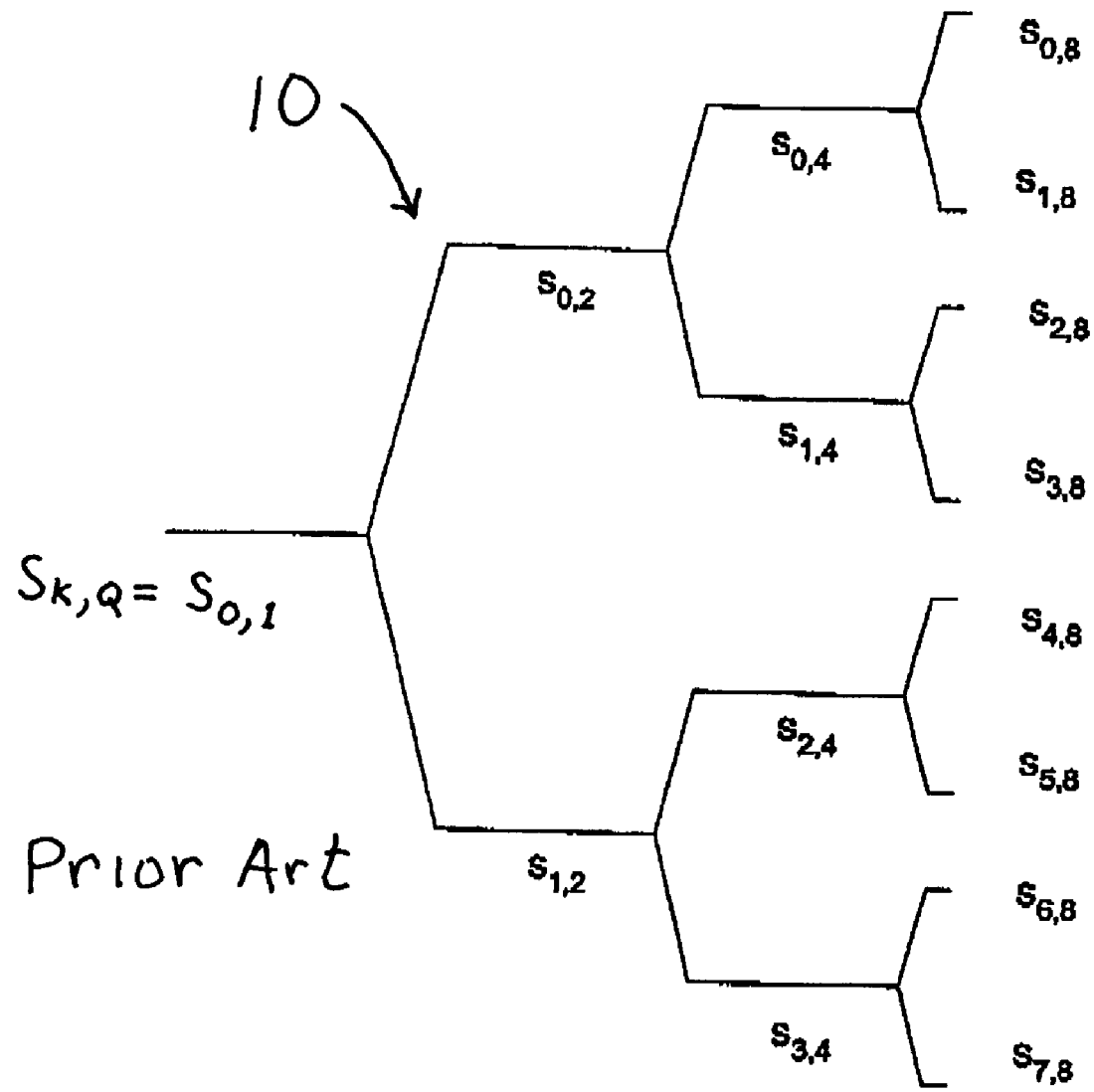
FIG. 1 is a diagram of the known Orthogonal Variable Spreading Factor Channelisation code relationship.

In FIG. 1, a known method of depicting Channelisation codes of difference spreading factors is shown in the tree-like structure (10). The available Channelisation codes are denoted by $S_{k,Q}$, where k is the index number and Q is the spreading factor. According to this known method, in order for a Channelisation code to be assigned no other codes of a higher or lower spreading factor along the same branch of the tree on which the code lies can already be assigned.

For example, if $S_{0,4}$ is the code to be assigned, then $S_{0,8}$, $S_{1,8}$, $S_{0,2}$, and $S_{0,1}$ cannot already be assigned.

As was previously stated, both the transmitter and receiver need to know which Training code and which Channelisation code to use. The complexity of the relationship between the Training code and the Channelisation code will depend on whether the telecommunication system is operating in an downlink mode (base station to mobile terminal) or uplink mode (mobile terminal to base station), and are thus the two modes of operation will be treated separately.

Figure 2:
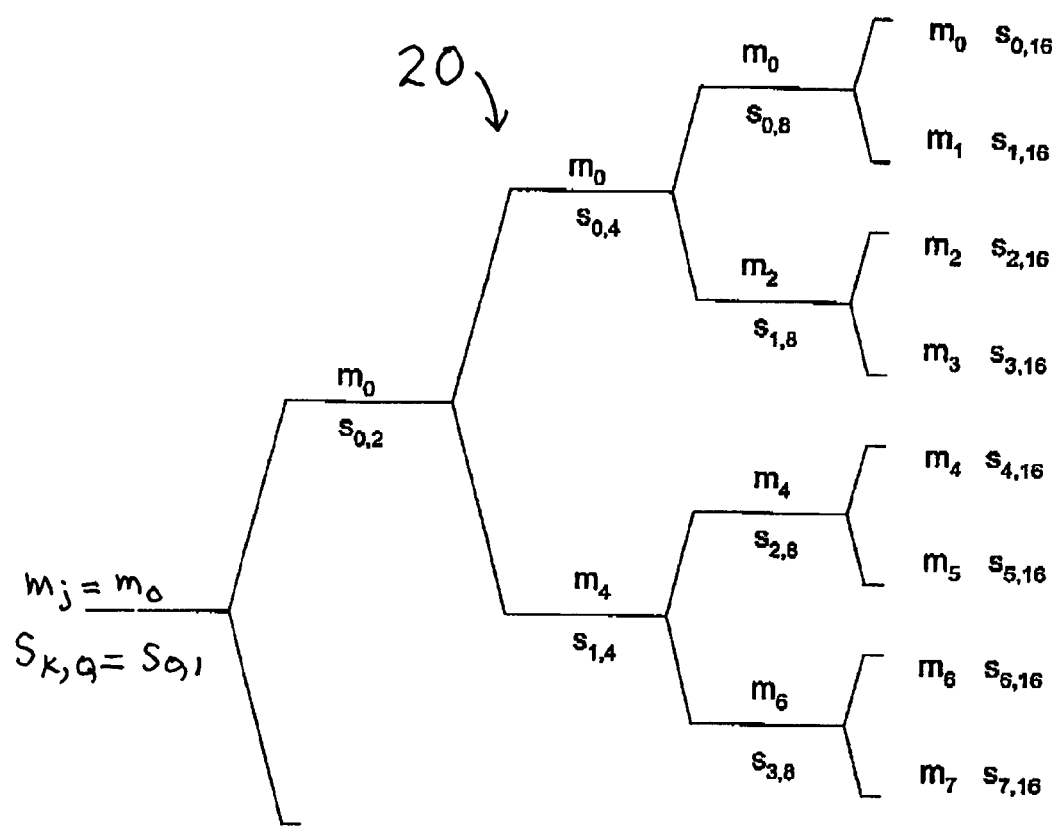
FIG. 2 is a diagram, according to the present invention, of the association between Training code and Channelisation code for the Uplink Mode of Operation.

In FIG. 2, the association, according to the present invention, between the Training code and the Channelisation code for the uplink mode of operation is showing in tree-like structure (20). As in FIG. 1, the available Channelisation codes are denoted by $S_{k,Q}$, where k is the index number and Q is the spreading factor. The available Training codes are denoted by $m_j$, where j is an integer indicating the maximum number of Training codes available for use in a given time slot. As will be appreciated by those skilled in the art, a plurality of Training codes and a plurality of Channelisation codes may be available.

The association, according to the present invention, between Training codes and Channelisation codes in an uplink mode of operation as shown in FIG. 2 will be explained with reference to the following example.

In a preferred embodiment of the present invention a single spreading factor is always used. In the following example of a preferred embodiment of the present invention a spreading factor of 16 is always used. As will be appreciated by those skilled in the art other spreading factors may be used without departing from the scope of the present invention. When a user first switches the mobile terminal on he is operating in an uplink mode on a non dedicated channel. The mobile terminal will select at random a Channelisation code with a spreading factor of 16 in which to use during the first transmission to the base station. Both the base station and the mobile terminal know the association of the codes as shown in FIG. 2. Thus once a Channelisation code with a spreading factor of 16 has been randomly selected, the Training code must be the one associated with it as per FIG. 2. For example, if the Channelisation code $S_{6,16}$ has been selected, the Training code $m_6$ must also be used. The data is encoded according to the Channelisation code $S_{6,16}$ and transmitted along with Training code $m_6$. The base station then operates to detect the data and the Training code. Upon determining which Training code has been used, the base station will be able to determine which Channelisation code to use based on the association of codes shown in FIG. 2. The base station will then be able to interpret the data.

During the downlink mode of operation, the requirements for code association are slightly more complicated. If the mobile terminal is to perform Joint Detection then it needs to know which are the active Channelisation codes and which codes are not active. It is not desirable for this information to be broadcast to all users because of the overhead required. Instead if different Training codes are assigned to each Channelisation code, then a user can easily detect which are the active codes by correlation with the known Training code, rather than attempting to measure the power in all possible codes. However the multiple spreading factors mean that there is a many to one relationship between the Channelisation code and Training code. Adopting a one to one relationship requires the user to correlate with more Training codes. However, if the relationship as shown in FIG. 3 is adopted, together with additional rules governing the assignment of Channelisation codes, then the mobile terminal can determine the ambiguity between the Training code and the Channelisation code.

Figure 3:
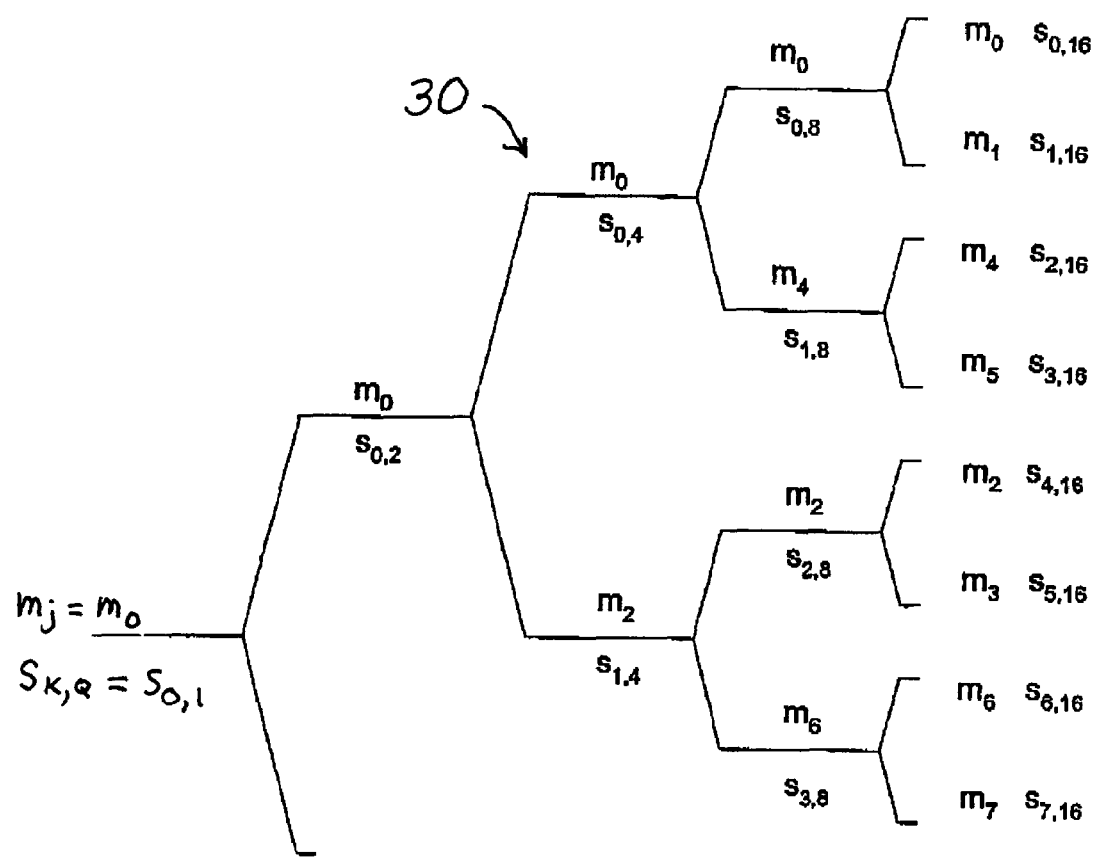
FIG. 3 is a diagram, according to the present invention, of the association between Training code and Channelisation code for the Downlink Mode of Operation.

In FIG. 3, the association, according to a further aspect of the present invention, between Training codes and Channelisation codes for the downlink mode of operation is shown in tree-like structure (30). The notation used in FIG. 3 is the same as used in FIGS. 1 and 2.

An assignment sequence is used in conjunction with the rules of the OVSF tree shown in FIG. 1, such that for a Channelisation code to be used, no other code with a spreading factor greater or smaller than the Channelisation code to be assigned can also be assigned along the same branch of the tree. A preferred assignment sequence for the association between Training code and Channelisation code is given below:

Q=16:{$m_1,m_0,m_5,m_4, m_3,m_2,m_7,m_6$}
Q=8:{$m_6,m_2, m_4,m_0$}
Q=4:{$m_2, m_0$}
Q=2:{$m_0$}

As will be appreciated by those skilled in the art alternative assignment sequences may be used without departing from the scope of the present invention.

Assignments for a particular spreading factor are made from left to right in the above sequences. Consequently, if the first Channelisation code uses Training code $m_1$ then subsequent use of Training code $M_0$ means that it must be associated with a spreading factor of 16, until Training code $m_1$ is relinquished. Similarly the use of Training code $m_0$ before Training code $m_1$ signifies that the spreading factor is 2. The assignment ordering above together with the rules of the OVSF tree means that Channelisation code can be determined, providing that the presence of the Training codes can be reliably detected.

The association, according to the present invention, between Training codes and Channelisation codes in an downlink mode of operation as shown in FIG. 3 will be explained with reference to the following example.

After a user has switched on his mobile terminal and established contact with the base station, the base station will then assign that user a Channelisation code and a Training code. However, as will be appreciated by those skilled in the art, in a CDMA or CTDMA system, several users may be operating in the same time slot, all with their own unique Channelisation code and Training code as assigned by the base station. The base station will transmit simultaneously all the data of the users operating in that given time slot. According to an aspect of the present invention, the base station will only transmit a single Training code with each user's data. Furthermore, the base station will assign Training codes accordingly to the assignment sequence given above. Both the base station and the mobile terminal will know the association of the codes as shown in FIG. 3 and the assignment sequence. The mobile terminal operating in Joint Detection will detect all the data and Training codes transmitted by the base station. Based on the order the Training codes are received, the mobile terminal will know which spreading factor has been used to encode the data. Knowing the Training code and the spreading factor allows the mobile terminal to determine the active Channelisation codes by reference to the association of codes shown in FIG. 3.

For example, if the Training codes $m_6, m_2, m_4,$ and $m_0$ are detected by the mobile terminal, then based on the assignment sequence given above, the mobile terminal knows that the spreading factor is 8. Now by referring to association of codes shown in FIG. 3, the mobile terminal will known that the Channelisation code $S_{3,8}, S_{2,8}, S_{1,8},$ and $S_{0,8}$ are active in the time slot and thus be looking for 4 sets of data.

As is well known in the art the Training code is easier to detect because it has a fixed sequence.

As was previously stated, the performance for the system is enhanced when the receiver knows which Channelisation codes are active in a given time slot. The present invention provides a method for doing this.

As will be appreciated by those skilled in the art, the method of associating codes as per the present invention, can be used in a mobile telecommunication system operating in CDMA or CTDMA.

Furthermore, the method according to the present invention can be used in UMTS.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of associating a Training code to a Channelization code for use in a mobile telecommunication system comprising a base station and a mobile terminal, the method comprising the steps of:
    selecting a Channelization code;
    encoding data according to the Channelization code;
    selecting a Training code based on a predetermined selection process;
    transmitting the Training code with the data;
    detecting the Training code and the data, and
    applying a set of rules to the Training code such that the Channelization code is known, thereby facilitating interpretation of the data;
    wherein the mobile telecommunications system is operating in an uplink mode, and the method further comprises the steps of,
    the mobile terminal selecting at random a Channelization code from a plurality of available Channelization codes;
    the predetermined selection process being such that the Training code selected for transmission to the base station is determined by the Channelization code selected; and
    the set of rules applied to the Training code upon detection by the base station being such that for each Training code detected the Channelization code used to encode the data received with that Training code is known.

2. A method as claimed in claim 1, wherein the spreading factor of the randomly selected Channelization code is 16.

3. A method of associating a Training code to a Channelization code for use in a mobile telecommunication system comprising a base station and a mobile terminal, the method comprising the steps of:
    selecting a Channelization code;
    encoding data according to the Channelization code;
    selecting a Training code based on a predetermined selection process;
    transmitting the Training code with the data;
    detecting the Training code and the data, and
    applying a set of rules to the Training code such that the Channelization code is known, thereby facilitating interpretation of the data;
    wherein the mobile telecommunications system is operating in a downlink mode, and further comprising the steps of,
    the base station assigning Training codes to users in a given time slot in a predetermined assignment sequence, the predetermined assignment sequence having a spreading factor associated therewith; and
    the base station and the mobile terminal having knowledge of the predetermined assignment sequence and associated spreading factor such that upon detection of the Training code by the mobile terminal the Channelization code used to encode the data is known.

4. A method as claimed in claim 3, wherein the predetermined assignment sequence is:
for Q=16: $\{m_1,m_0,m_5,m_4, m_3,m_2,m_7,m_6\}$
for Q=8: $\{m_6,m_2, m_4,m_0\}$
for Q=4: $\{m_2, m_0\}$
for Q=2: $\{m_0\}$
where Q equals the spreading factor and $m_j$ represents the available Training codes.

5. A Code-Division Multiple Access mobile telecommunication system using the method as claimed in claim 1.

6. A code-Time Division Multiple Access mobile telecommunications system using the method as claimed in claim 1.

7. A time division duplex mobile telecommunication system using the method as claimed in claim 1.

8. A UMTS mobile telecommunications system using the method as claimed in claim 1.

* * * * *